J. M. BUTCHER.
MOUSE TRAP.
APPLICATION FILED DEC. 17, 1912.
1,085,970.
Patented Feb. 3, 1914.
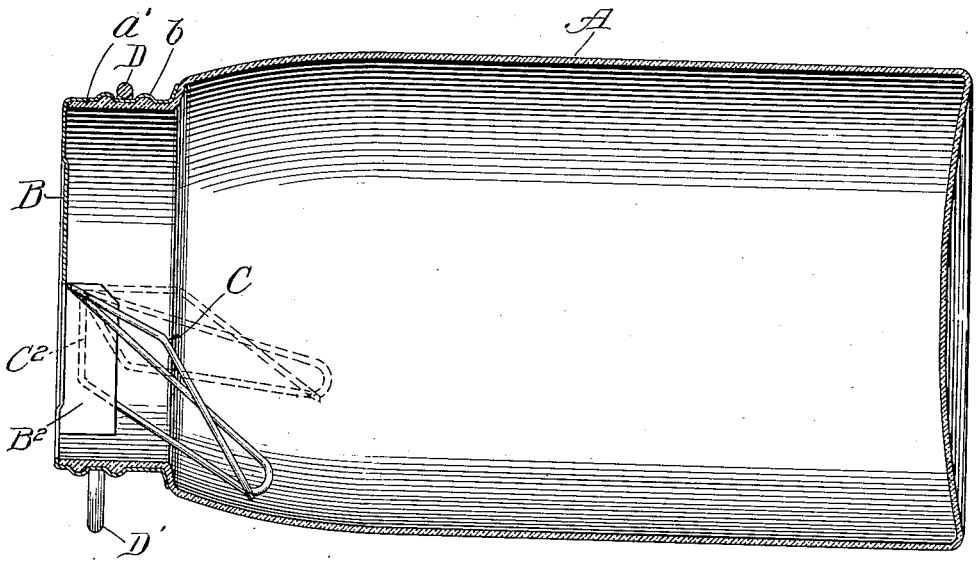
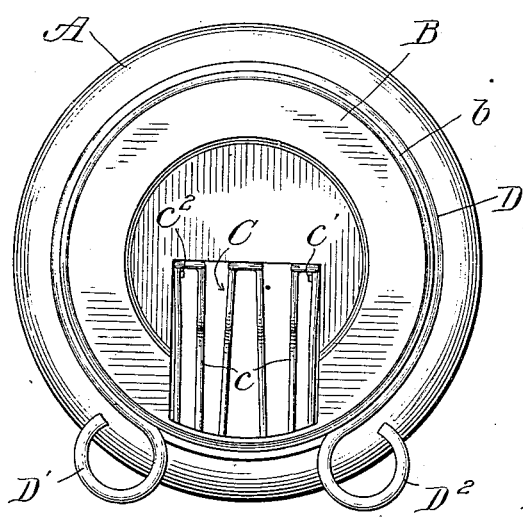
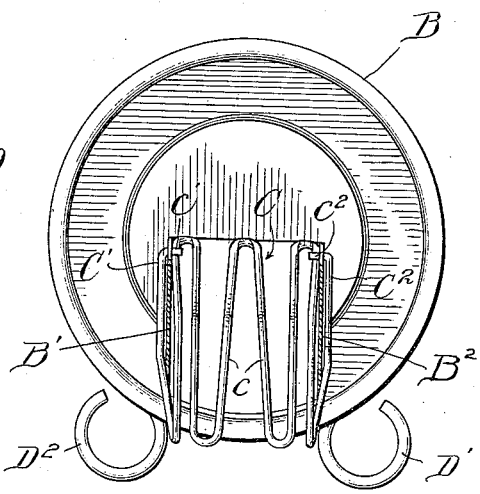
Witnesses:
Harry S. Gaither
Anna L. Walton
Inventor:
James M. Butcher
by Sheridan, Wilkinson, Scott & Richmond
Attys

UNITED STATES PATENT OFFICE.

JAMES M. BUTCHER, OF CHICAGO, ILLINOIS, ASSIGNOR TO CHARLES R. STREET, OF CHICAGO, ILLINOIS.

MOUSE-TRAP.

1,085,970.	Specification of Letters Patent.	Patented Feb. 3, 1914.

Application filed December 17, 1912. Serial No. 737,161.

*To all whom it may concern:*

Be it known that I, JAMES M. BUTCHER, a citizen of the United States, residing at Chicago, in the county of Cook and State of Illinois, have invented certain new and useful Improvements in Mouse-Traps, of which the following is a specification.

My invention relates in general to animal traps, and more particularly to means for converting an ordinary Mason jar into a mouse trap.

It is well-known that mouse traps of the ordinary constructions soon become useless after a few mice have been caught and killed in them, as other mice become suspicious and will not enter the traps. Furthermore, traps which require the mice to trip a trigger are not always sensitive enough to prevent the mice from stealing the bait and escaping without being caught.

The primary object of my invention is to provide a mouse trap which may be readily washed so as to be capable of indefinite use; which will not be dependent upon the tripping of a trigger by the mice; and which will avoid any chance of the bait being stolen without catching the mice.

A further object of my invention is to provide a mouse trap comprising an ordinary Mason fruit jar, the cover of which is formed with an opening controlled by an automatically closing gate.

A further object of my invention is to provide an ordinary screw cap for closing a jar with a pivoted gravity gate controlling an opening therethrough, which may be attached to any ordinary jar in the same manner that the usual cap is ordinarily screwed thereto.

A still further object of my invention is to provide a trap for mice or other animals, which will be simple in construction, inexpensive to manufacture, efficient in operation, and durable in use.

My invention will be more fully disclosed hereinafter with reference to the accompanying drawing, in which—

Figure 1 is a longitudinal section through the center of a jar provided with my invention. Fig. 2 is an end elevational view looking from the left in Fig. 1. Fig. 3 is an inside view of the cap removed from the jar.

The same reference characters will be used to designate the same parts in the several figures of the drawing.

Reference character A designates a receptacle, preferably formed of glass, such as an ordinary Mason fruit jar.

$a'$ indicates the mouth of the receptacle which is preferably provided with an exterior screw thread to be engaged by a correspondingly screw threaded cylindrical flange $b$ of the cap B. An opening is formed through the cap B preferably by bending inwardly portions of the material of the end of the cap to form parallel flanges B' and B² at each side of the opening, the latter preferably extending to the periphery of the cap, as clearly shown in Figs. 1 and 2.

C designates an automatically closing gate for permitting ingress to and preventing exit from the interior of the receptacle A. This gate may conveniently consist of wire bent to form a plurality of bars $c$ spaced sufficiently close together to prevent an animal from passing between them. The wire forming the gate terminates in side portions C' and C² which overlie the inwardly projecting flanges B' and B² at the opposite sides of the hole through the cover. The ends of the side portions C' and C² are bent inwardly as shown at $c'$ and $c^2$, and extend through holes adjacent the tops of the flanges B' and B², so as to thereby pivotally support the gate.

In order to support the receptacle in a horizontal position with the opening through the cap thereof close to the supporting surface, radial supports D' and D² are secured to the cap so as to rest upon the supporting surface and prevent rotation of the receptacle from its normal operative position. These radial supports may be conveniently formed as eyes at the ends of a resilient wire ring D which will frictionally engage the cap and be thereby retained in proper position thereon. The ring D may further be used for applying and removing the cap by merely inserting the thumb and first finger of the hand through the eyes D' and D² and pressing them together so as to cause the ring to tightly clamp the cap.

In using my improved mouse trap, a piece of cheese or other bait is placed in the receptacle so as to attract the mouse. In order to get the bait the mouse passes inwardly through the opening in the cap and lifts the gate so as to pass thereunder into the receptacle. The gate then falls by gravity and prevents the exit of the mouse from the receptacle.

It will be observed that by my invention caps of the usual size for removably engaging ordinary Mason jars can be formed with an opening and have secured thereto a gate so that the caps may be manufactured and sold independently of the jars and applied to the jars by the purchasers. It will be further observed that by my invention a mouse trap may be conveniently constructed which will be capable of catching a number of mice and which may be readily cleaned so as to be capable of repeated use.

While I have described more or less in detail the specific form in which I have illustrated my invention as embodied, yet I do not wish to be understood as limiting myself thereto, as I contemplate changes in form, proportion of parts, and the substitution of equivalents as circumstances may suggest or render expedient without departing from the spirit of my invention.

I claim:

In a mouse trap, the combination with a receptacle having an opening through one wall thereof, of rearwardly projecting vertical flanges at the sides of said opening, a wire gate having normally downwardly inclining central and side portions, said side portions overlapping said flanges and coöperating therewith to prevent exit through said opening beneath the sides of the gate, and means for pivotally connecting said side members of the gate to said flanges adjacent the top of said opening.

In testimony whereof, I have subscribed my name.

JAMES M. BUTCHER.

Witnesses:
 GEO. L. WILKINSON,
 ANNIE C. COURTENAY.

Copies of this patent may be obtained for five cents each, by addressing the "Commissioner of Patents, Washington, D. C."